United States Patent
Zhao

(10) Patent No.: US 9,936,189 B2
(45) Date of Patent: Apr. 3, 2018

(54) METHOD FOR PREDICTING STEREOSCOPIC DEPTH AND APPARATUS THEREOF

(71) Applicant: BOE TECHNOLOGY GROUP CO., LTD., Beijing (CN)

(72) Inventor: Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/501,850

(22) PCT Filed: May 20, 2016

(86) PCT No.: PCT/CN2016/082886
§ 371 (c)(1),
(2) Date: Feb. 5, 2017

(87) PCT Pub. No.: WO2017/032096
PCT Pub. Date: Mar. 2, 2017

(65) Prior Publication Data
US 2017/0237969 A1    Aug. 17, 2017

(30) Foreign Application Priority Data

Aug. 26, 2015 (CN) .......................... 2015 1 0531400

(51) Int. Cl.
*G06K 9/00* (2006.01)
*H04N 13/02* (2006.01)
(Continued)

(52) U.S. Cl.
CPC ....... *H04N 13/0271* (2013.01); *G06K 9/6202* (2013.01); *G06K 9/6215* (2013.01);
(Continued)

(58) Field of Classification Search
CPC . G06T 15/20; G06T 2207/10012; G06T 7/85; G06T 2207/10028; G06T 7/50;
(Continued)

(56) References Cited

U.S. PATENT DOCUMENTS

2011/0115886 A1* 5/2011 Nguyen ............... H04N 13/025
348/47
2012/0314776 A1* 12/2012 Shimizu ............... H04N 19/597
375/240.25

(Continued)

FOREIGN PATENT DOCUMENTS

| CN | 101072367 A | 11/2007 |
|----|-------------|---------|
| CN | 101393497 A | 3/2009  |

(Continued)

OTHER PUBLICATIONS

International Search Report & Written Opinion dated Aug. 24, 2016 regarding PCT/CN2016/082886.

(Continued)

*Primary Examiner* — Vu Le
*Assistant Examiner* — Guillermo Rivera-Martinez
(74) *Attorney, Agent, or Firm* — Intellectual Valley Law, P.C.

(57) ABSTRACT

The present application discloses a method for predicting stereoscopic depth comprising capturing object images of a target scene; generating a stereoscopic depth image associated with the object images; identifying a no-depth-data region in the stereoscopic depth image; identifying a depth-data region correlated to the no-depth-data region; and assigning a depth data to the no-depth-data region based on a depth data of the depth-data region correlated to the no-depth-data region.

20 Claims, 4 Drawing Sheets

(51) Int. Cl.
*G06T 7/593* (2017.01)
*G06K 9/62* (2006.01)
*H04N 13/00* (2018.01)

(52) U.S. Cl.
CPC ............ *G06K 9/6267* (2013.01); *G06T 7/593* (2017.01); *H04N 13/0239* (2013.01); *G06T 2207/10012* (2013.01); *G06T 2207/10028* (2013.01); *G06T 2207/20021* (2013.01); *H04N 2013/0081* (2013.01)

(58) Field of Classification Search
CPC ..... G06T 17/00; G06T 19/00; H04N 13/0022; H04N 2013/0081; H04N 13/0007; H04N 13/004; H04N 19/176
See application file for complete search history.

(56) References Cited

U.S. PATENT DOCUMENTS

| | | | |
|---|---|---|---|
| 2013/0229485 A1* | 9/2013 | Rusanovskyy | H04N 13/0048 348/43 |
| 2014/0098100 A1* | 4/2014 | Dane | H04N 13/0271 345/427 |
| 2014/0177909 A1 | 6/2014 | Lin et al. | |
| 2015/0042767 A1* | 2/2015 | Ciurea | G06T 15/20 348/48 |
| 2015/0077520 A1 | 3/2015 | Ohba et al. | |
| 2016/0198144 A1 | 7/2016 | Yu et al. | |

FOREIGN PATENT DOCUMENTS

| | | |
|---|---|---|
| CN | 101610423 A | 12/2009 |
| CN | 102005039 A | 4/2011 |
| CN | 103458261 A | 12/2013 |
| CN | 103955954 A | 7/2014 |
| CN | 104380338 A | 2/2015 |
| CN | 104539934 A | 4/2015 |
| CN | 104850850 A | 8/2015 |
| JP | 2000215311 A | 8/2000 |

OTHER PUBLICATIONS

First Office Action in the Chinese Patent Application No. 201510531400.X, dated Jul. 24, 2017; English translation attached.

* cited by examiner

METHOD FOR PREDICTING STEREOSCOPIC DEPTH AND APPARATUS THEREOF

CROSS-REFERENCE TO RELATED APPLICATION

This application is a national stage application under 35 U.S.C. § 371 of International Application No. PCT/CN2016/082886, filed May 20, 2016, which claims priority to Chinese Patent Application No. 201510531400.X, filed Aug. 26, 2015, the contents of which are incorporated by reference in the entirety.

TECHNICAL FIELD

The present invention relates to image processing techniques, particularly to a method for predicting stereoscopic image depth and an apparatus thereof.

BACKGROUND

Stereo vision technology is to restore original three-dimensional shape information from two-dimensional shape information obtained in a scene image. It can be applied in many fields such as robot navigation and aerial survey, three-dimensional survey, pose detection and control in micro operating system.

Typically, stereo vision is realized by following procedures. Firstly, as shown in FIG. 1, a main camera A1 and a sub-camera A2 are used to capture target scene including foreground objects 1' and background objects 2' to obtain two object images. Then, the images are processed to match every pair of two image points in respective two object images corresponding to a same point in the pre-image. Subsequently, a parallax between the two image points can be obtained. Based on this parallax, a stereoscopic depth information of the object image obtained by the main camera A1 can be determined, and the three-dimensional shape information of the target scene can be reconstructed based on the stereoscopic depth information.

SUMMARY

In one aspect, the present invention provides a method for predicting stereoscopic depth comprising capturing object images of a target scene; generating a stereoscopic depth image associated with the object images; identifying a no-depth-data region in the stereoscopic depth image; identifying a depth-data region correlated to the no-depth-data region; and assigning a depth data to the no-depth-data region based on a depth data of the depth-data region correlated to the no-depth-data region.

Optionally, the step of identifying the depth-data region correlated to the no-depth-data region comprises categorizing the object image of the target scene into a plurality of categorized pixel blocks based on image characteristics in the object image; and searching through the plurality of categorized pixel blocks to identify a first pixel block associated with a no-depth-data region.

Optionally, the step of identifying the depth-data region correlated to the no-depth-data region further comprises Optionally, calculating a correlation strength between each two adjacent pixel blocks among the plurality of categorized pixel blocks; identifying a most relevant pixel block correlated to the first pixel block associated with the no-depth-data region based on the correlation strength between each two adjacent pixel blocks; and assigning a depth-data region associated with the most relevant pixel block as the depth-data region correlated to the no-depth-data region.

Optionally, identifying a depth-data region correlated to the no-depth-data region further comprising identifying a second pixel block having a depth-data region proximal to the no-depth-data region; and determining whether the first pixel block and the second pixel block are a same pixel block.

Optionally, the first pixel block and the second pixel block are determined to be a same pixel block; the method further comprising assigning the depth-data region in the second pixel block as the depth-data region correlated to the no-depth-data region in the first pixel block.

Optionally, the first pixel block and the second pixel block are determined to be two different pixel blocks; the method further comprising calculating a correlation strength between each two adjacent pixel blocks among the plurality of categorized pixel blocks; identifying the most relevant pixel block correlated to the pixel block associated with the no-depth-data region; and assigning one or more a depth-data region associated with the most relevant pixel block as a depth-data region correlated to the no-depth-data region.

Optionally, the first pixel block and the second pixel block are determined to be a same pixel block; the method further comprising directly assigning the depth data in the depth-data region as the depth data for the no-depth-data region.

Optionally, the first pixel block and the second pixel block are determined to be a same pixel block; the method further comprising interpolating the depth data in the depth-data region to obtain an interpolated depth data corresponding to the no-depth-data region; and assigning the interpolated depth data as the depth data for the no-depth-data region.

Optionally, the first pixel block and the second pixel block are determined to be two different pixel blocks, and more than one most relevant pixel blocks are identified; the method further comprising averaging all depth data in all of the more than one most relevant pixel blocks to obtain an averaged depth data; and assigning the average depth data as the depth data for the no-depth-data region.

Optionally, each categorized pixel block has an area no smaller h the no-depth-data region.

Optionally, the method further comprises populating the depth data assigned to the no-depth-data region, pixel-by-pixel, into a corresponding no-depth-data region in the stereoscopic depth image.

In another aspect, the present invention provides an apparatus for predicting stereoscopic depth comprising an image capturing module for capturing object images of a target scene and generating a stereoscopic depth image associated with the object images; a first determination module coupled to the image capturing module for identifying a no-depth-data region in the stereoscopic depth image and a depth-data region correlated to the no-depth-data region; and a second determination module coupled to the first determination module for assigning a depth data to the no-depth-data region based on a depth data of the depth-data region correlated to the no-depth-data region.

Optionally, the first determination module is configured to perform operations of categorizing the object image of a target scene into a plurality of categorized pixel blocks based on image characteristics in the object image; calculating a correlation strength between each two adjacent pixel blocks among the plurality of categorized pixel blocks; searching through the plurality of categorized pixel blocks to identify a pixel block associated with a no-depth-data region; identifying a most relevant pixel block correlated to the pixel block associated with the no-depth-data region based on the correlation strength between each two adjacent pixel blocks; and assigning a depth-data region associated with the most relevant pixel block as the depth-data region correlated to the no-depth-data region.

Optionally, the first determination module is configured to perform operations of categorizing the object image of a target scene into a plurality of categorized pixel blocks based on image characteristics in the object image; searching through the plurality of categorized pixel blocks to identify a first pixel block corresponding to a no-depth-data region; identifying a second pixel block having a depth-data region proximal to the no-depth-data region; and determining whether the first pixel block and the second pixel block are a same pixel block.

Optionally, the first pixel block and the second pixel block are determined to be a same pixel block; the first determination module is configured to perform operations of assigning the depth-data region in the second pixel block as the depth-data region correlated to the no-depth-data region in the first pixel block.

Optionally, the first pixel block and the second pixel block are determined to be two different pixel blocks; the first determination module is configured to perform operations of calculating a correlation strength between each two adjacent pixel blocks among the plurality of categorized pixel blocks; identifying the most relevant pixel block correlated to the pixel block associated with the no-depth-data region; and assigning one or more a depth-data region associated with the most relevant pixel block as a depth-data region correlated to the no-depth-data region.

Optionally, the first pixel block and the second pixel block are determined to be a same pixel block; the second determination module is configured to perform operations of directly assigning the depth data in the depth-data region as the depth data for the no-depth-data region.

Optionally, the first pixel block and the second pixel block are determined to be a same pixel block; the second determination module is configured to perform operations of interpolating the depth data in the depth-data region to obtain an interpolated depth data corresponding to the no-depth-data region; and assigning the interpolated depth data as the depth data for the no-depth-data region.

Optionally, the first pixel block and the second pixel block are determined to be two different pixel blocks, and more than one most relevant pixel blocks are identified; the second determination module is configured to perform operations of averaging all depth data in all of the more than one most relevant pixel blocks to obtain an averaged depth data; and assigning the average depth data as the depth data for the no-depth-data region.

Optionally, the apparatus further comprises a depth data populating module coupled to the first determination module and the second determination module, respectively, for populating the depth data assigned for the no-depth-data region pixel-by-pixel into the no-depth-data region in the stereoscopic depth image

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
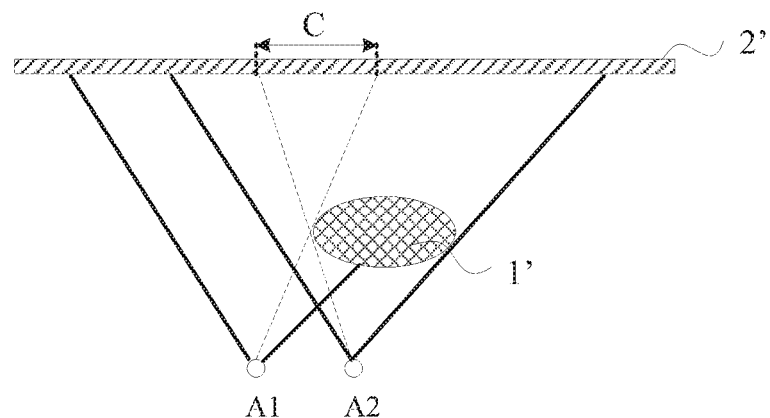
FIG. 1 is a schematic diagram illustrating parallax occlusion phenomenon in the conventional stereo vision technology, which results in an absence of depth information in the depth conversion area.

The present disclosure identities several issues with the convention method for determining stereoscopic depth information of an object image. Referring to FIG. 1, the main camera A1 and the sub-camera A2 are spaced apart by a distance, resulting in a parallax occlusion phenomenon, i.e., a scene in a depth conversion area C can only be captured by the main camera A1 but not by the sub-camera 42. In the object image obtained by the main camera A1, image points associated with the depth conversion area C cannot be matched with any image point in the object image obtained by the sub-camera A2. As a result, the depth information and the three-dimensional shape information associated with the depth conversion area C cannot be obtained.

The present disclosure provides an improved image process method and apparatus that overcome the disadvantages and shortcoming of the conventional method and apparatus. Using the present method and apparatus, full stereoscopic depth information associated with the depth conversion area C can be obtained, resulting in improved reconstruction of three dimensional shape information.

Figure 2:
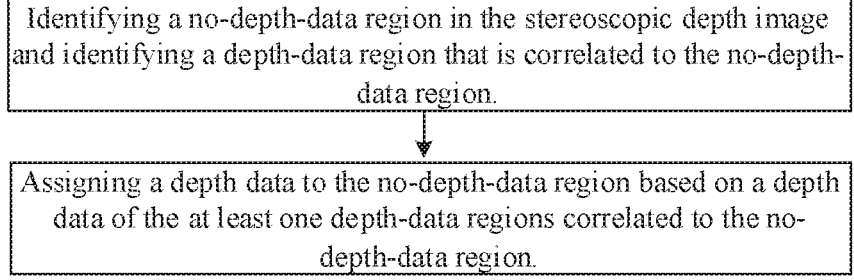
FIG. 2 is flow chart illustrating a method for predicting stereoscopic depth in some embodiments.

FIG. 2 is flow chart illustrating a method for predicting stereoscopic depth in some embodiments. Referring to FIG. 2, the method of predicting stereoscopic depth in the embodiment includes capturing object images of a target scene and generating a stereoscopic depth image associated with the object images. The target scene includes foreground objects and background objects. For instance, object images can be captured by a binocular vision depth measurement system, from which the stereoscopic depth image associated with the object images can be generated. Optionally, the binocular vision depth measurement system includes at least a main camera and a sub-camera.

Optionally, the step of capturing object images of a target scene includes capturing a first object image of the target scene using a main camera and capturing a second object image of the target scene using a sub-camera. Optionally, the main camera and the sub-camera are spaced apart at two different positions.

Optionally, the step of generating the stereoscopic depth image associated with the object images includes pairing a first image point from the first object image and a second image point from a second object image, the first image point and the second image point corresponding to a same point in the pre-image; deriving parallax information for the pair of the first image point from the first object image and the second image point from a second object image; determining the stereoscopic depth data for the first object image based on the parallax information of a plurality of pairs (e.g., all pairs) of the first image point from the first object image and the second image point from a second object image; and generating a stereoscopic depth image based on the stereoscopic depth data for the first object image.

In some embodiments, capturing object images and generating associated stereoscopic depth image is performed using a structured light stereoscopic depth measurement system. Optionally, the structured light stereoscopic depth measurement system includes a camera and a laser device.

Optionally, the step of capturing object images of a target scene is performed using the camera of the structured light stereoscopic depth measurement system. Optionally, the step of generating stereoscopic depth image includes generating structured light having certain emission mode(s) (e.g., a spot mode or a line mode) using the laser device; illuminating a surface of the foreground objects of the target scene, and forming a three-dimensional light image of the surface shape of the foreground objects. Optionally, the method of generating stereoscopic depth image further includes capturing a corresponding two-dimensional light image using the sub-camera placed at a different position, thereby generating a stereoscopic depth image based on, inter alia, the three-dimensional light image, the two-dimensional light image, and the relative position between the laser device and the sub-camera.

Optionally, each of the images discussed hereinthroughout is a color image.

Referring to FIG. 2, the method of predicting stereoscopic depth in the embodiment further includes identifying a no-depth-data region in the stereoscopic depth image and identifying a depth-data region that is correlated to the no-depth-data region.

Optionally, the stereoscopic depth image includes a matrix of pixels arranged in multiple rows and columns. Optionally, the step of identifying a no-depth-data region in the stereoscopic depth image includes scanning the depth data in the stereoscopic depth image in each line of pixels on a row-to-row or column-to-column basis. Optionally, the scanning is performed pixel-by-pixel from one end of each row (or column) to another end of the row (or column). Various alternative embodiments may be practiced to identifying the no-depth-data region in the stereoscopic depth image. Optionally, a region absent of any depth data entry in the stereoscopic depth image is defined as a no-depth-data region. In one example, a region associated with a depth data of "0" in the stereoscopic depth image may be defined as a no-depth-data region.

The step of capturing object images of a target scene and generating a stereoscopic depth image associated with the object images, and the step of identifying a no-depth-data region in the stereoscopic depth image and identifying one or more depth-data regions that are correlated to the no-depth-data region, may be performed in various sequential orders.

In some embodiments, the method includes consecutively capturing object images of a target scene and generating a stereoscopic depth image associated with the object images multiple times, e.g., capturing multiple sets of object images of a target scene and generating multiple stereoscopic depth images thereof. Subsequently, the method further includes consecutively identifying the no-depth-data region in each of the multiple stereoscopic depth images, and consecutively identifying one or more depth-data regions that are correlated to each no-depth-data region in each of the multiple stereoscopic depth images.

In some embodiments, the method includes a first step of capturing object images of a target scene and generating a stereoscopic depth image associated with the object images for a single time, e.g., capturing a single set of object images of a target scene and generating a single stereoscopic depth image thereof, followed by a second step of identifying the no-depth-data region in the single stereoscopic depth image and identifying one or more depth-data regions correlated to the no-depth-data region in the single stereoscopic depth image, and repeating a cycle of the first step and the second step consecutively for multiple times.

Referring to FIG. 2, the method of predicting stereoscopic depth in the embodiment further includes a step of assigning a depth data to the no-depth-data region based on a depth data of the at least one depth-data regions correlated to the no-depth-data region. Optionally, the depth data detected in the associated one or more depth-data regions are directly assigned as the depth data for the no-depth-data region.

The present disclosure provides a superior method of predicting stereoscopic depth. The present method assigns a depth data to the no-depth-data region based on the depth data of one or more depth-data regions correlated to the no-depth-data region. The present method thus overcomes the problem associated with the absence of depth data in the depth conversion area caused by the parallax occlusion phenomenon. As a result, complete stereoscopic depth information associated with the depth conversion area C can be obtained, resulting in improved reconstruction of three dimensional shape information.

Figure 3:
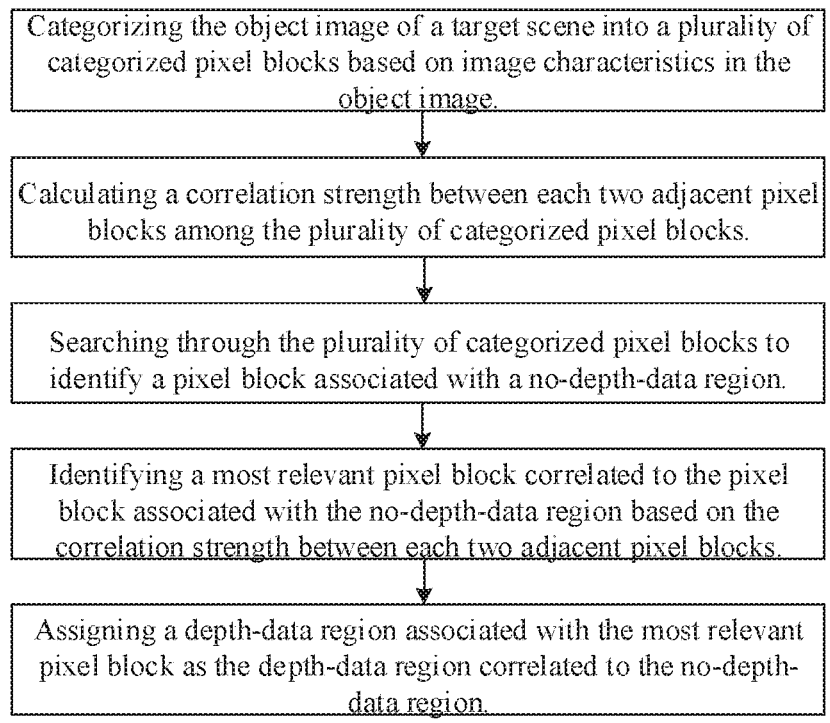
FIG. 3 is a flow chart showing a method for identifying a depth-data region correlated to a no-depth-data region in some embodiments.

The step of identifying one or more depth-data regions that are correlated to the no-depth-data region may be performed in at least two different methods. FIG. 3 is a flow chart showing a first method for identifying a depth-data region correlated to a no-depth-data region in some embodiments. Referring to FIG. 3, the first method in the embodiment includes categorizing the object image of a target scene into a plurality of pixel blocks based on image characteristics in the object image. Examples of image characteristics include color, grey scale, texture, contour, shape, etc. Optionally, each categorized pixel block includes a plurality of pixels having the same and/or similar image characteristics. Optionally, pixels having the same or similar image characteristics are categorized into one pixel block. Optionally, pixels having the same image characteristics are categorized into one pixel block, and pixels in pixel blocks adjacent to each other have similar image characteristics. Optionally, positional information corresponding to the pixels in the pixel blocks is stored in a partition table. Optionally, the partition table is a data table including pixel location information (row and column information) of each pixel, and an ID number of a pixel block corresponding to each pixel. Thus, the pixel block corresponding to each pixel can be identified based on the pixel location information using this data table. Moreover, the pixel location information of a pixel in a stereoscopic depth image is the same as that of the corresponding pixel in the object image. Accordingly, the pixel block corresponding to each pixel in a stereoscopic depth image can be identified based on the pixel location information using this data table.

Various image partition methods may be employed to categorize the object image into a plurality of pixel blocks. Examples of image partition methods include a Watershed algorithm and a Mean-shift algorithm.

In some embodiments, a Watershed algorithm is used to categorize the object image into a plurality of pixel blocks. The Watershed algorithm is a morphology-based non-linear image partition algorithm. Using this algorithm, the object image is treated like a surface topography in which image grey scale corresponds to altitude. A local minimum of the grey scale corresponds to a "valley", and a local maximum of the grey scale corresponds to a "peak". Typically, the Watershed algorithm requires four processes, e.g., image simplification, gradation approximation, detection of watershed region, and region merging. The first two processes are wave-filtering processes. The region merging process eliminates over-segmentation.

In some embodiments, a Mean-shift algorithm is used to categorize the object image into a plurality of pixel blocks. The Mean-shift algorithm is a method involving iterative process. Typically, the Mean-shift algorithm includes a process of calculating an average offset value of a point, followed by shifting this point to the location corresponding to the average offset value. The algorithm then repeats this process using the location corresponding to the average offset value as a new starting point, calculates a new average offset value, and shifts the new starting point to a new location corresponding to the new average offset value. This process is repeated until a certain condition is satisfied. When applying the Mean-shift algorithm to the image partition operation, this iterative process is performed to each image pixel until convergence then a finalized value is assigned to the pixel. Using this algorithm, similar regions in the image will merge into a single flat region. Image segmentation is achieved by classifying pixels having different values in different flat regions. Optionally, a region merging process can be performed to reduce the number of segments. In general, image partition using the Mean-shift algorithm takes longer computing time while achieving better outcome in the categorizing pixel blocks, whereas image partition may be achieved with a faster speed using the Watershed algorithm. Appropriate image partition methods may be selected based on the needs of various actual applications.

Referring to FIG. 3, the first method for identifying a depth-data region correlated to a no-depth-data region in the embodiment further includes calculating a correlation strength between each two adjacent pixel blocks among the plurality of categorized pixel blocks. For example, pixel blocks adjacent to each other may be identified based on whether one pixel block contains at least one pixel that is located adjacent to at least one pixel in the other pixel block. Optionally, adjacent pixel blocks are identified by directly searching through the partition table. Optionally, a regional similarity method or a boundary strength similarity method may be applied to calculate the correlation strength between two adjacent pixel blocks.

Using the regional similarity method as an example, the regional similarity of adjacent pixel blocks is represented by a similarity of average grey scale level of these pixel blocks based on the following formula:

$$\delta(R_i, R_j) = \frac{\|R_i\| \cdot \|R_j\|}{\|R_i\| + \|R_j\|} [\mu(R_i) - \mu(R_j)]^2,$$

wherein $R_i$ and $R_j$ stand for two adjacent pixel blocks with ID numbers i and j, respectively; $\|R_i\|$ and $\|R_j\|$ are numbers of pixels in pixel blocks $R_i$ and $R_j$, respectively; $\mu(R_i)$ and $\mu(R_j)$ are average grey scale levels in pixel blocks and $R_i$ and $R_j$, respectively. Based on the similarity of average grey scale level of two adjacent pixel blocks, a correlation strength between these two pixel blocks can be derived. A higher similarity of average grey scale level between two adjacent pixel blocks indicates a higher correlation strength between them, and vise versa.

Referring to FIG. 3, the first method for identifying a depth-data region correlated to a no-depth-data region in the embodiment further includes searching through the plurality of categorized pixel blocks to identify a pixel block associated with a no-depth-data region. For example, the pixel block corresponding to a no-depth-data region may be identified by obtaining the location information (i.e., row/column information) of no-depth-data, searching through the partition table to identify pixel block(s) having a matching location information, thereby identifying the pixel block associated with the no-depth-data region.

Optionally, the step of searching through the plurality of categorized pixel blocks to identify a pixel block associated with a no-depth-data region is performed prior to the step of calculating a correlation strength between each two adjacent pixel blocks among the plurality of categorized pixel blocks. Optionally, the searching step is performed subsequent to the calculating step. Optionally, the searching step is performed simultaneously with the calculating step.

Referring to FIG. 3, the first method for identifying a depth-data region correlated to a no-depth-data region in the embodiment further includes identifying a most relevant pixel block correlated to the pixel block associated with the no-depth-data region based on the correlation strength between each two adjacent pixel blocks. Optionally, the most relevant pixel block is a pixel block adjacent to, and having the largest correlation strength with, the pixel block associated with the no-depth-data region. Optionally, the step of identifying the most relevant pixel block includes obtaining correlation strengths between the pixel block associated with the no-depth-data region and each pixel block adjacent to it based on the previously calculated correlation strengths for all pairs of every two adjacent pixel blocks; comparing the obtained correlation strengths to each other; and selecting one or more the most relevant pixel block that has the largest correlation strength among the obtained correlation strengths.

Referring to FIG. 3, the first method for identifying a depth-data region correlated to a no-depth-data region in the embodiment further includes assigning a depth-data region associated with the most relevant pixel block as the depth-data region correlated to the no-depth-data region.

Once the depth-data region associated with the most relevant pixel block is assigned as the depth-data region correlated to the no-depth-data region, a depth data may be assigned to the no-depth-data region.

Optionally, the step of assigning a depth data to the no-depth-data region based on the detected depth data for the one or more depth-data regions correlated to the no-depth-data region includes obtaining an average value of the depth data for the one or more depth-data regions in the most relevant pixel block; and assigning the average value as the depth data for the no-depth-data region.

Optionally, the depth data in the most relevant pixel block may include a grey scale level associated with each pixel in the most relevant pixel block. Optionally, the step of assigning a depth data to the no-depth-data region based on the detected depth data for the one or more depth-data regions correlated to the no-depth-data region includes obtaining an average value of the grey scale levels for the one or more depth-data regions in the most relevant pixel block; and assigning the average value of the grey scale levels as the depth data for the no-depth-data region. Optionally, each of the most relevant pixel block includes at least one depth data. Optionally, each of the most relevant pixel block includes a plurality of depth data that have a same value. Optionally, each of the most relevant pixel block includes a plurality of depth data that have different values.

Figure 4:
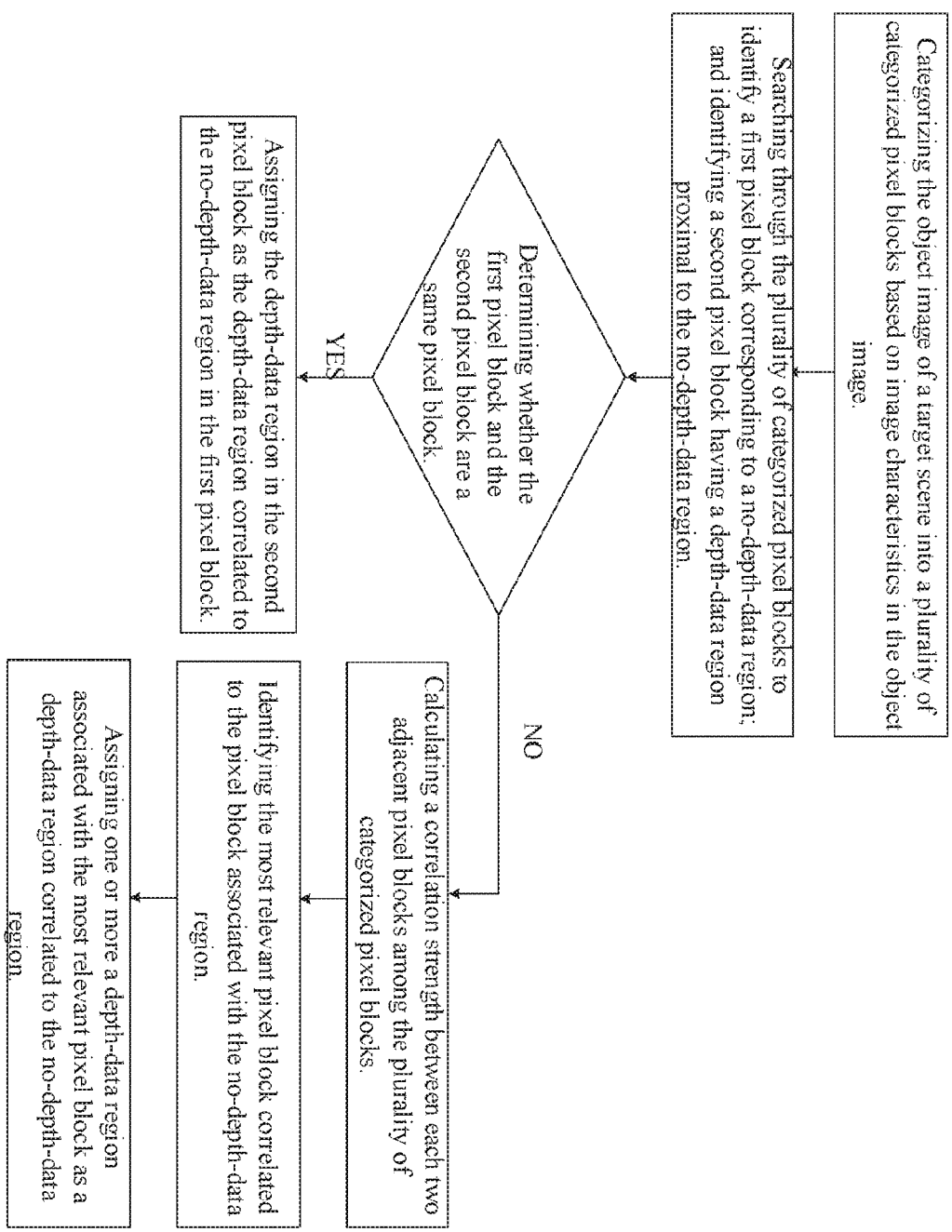
FIG. 4 is a flow chart showing a method for identifying a depth-data region correlated to a no-depth-data region in some embodiments.

FIG. 4 is a flow chart showing a second method for identifying a depth-data region correlated to a no-depth-data region in some embodiments. Referring to FIG. 4, the method in the embodiment includes categorizing the object image of a target scene into a plurality of categorized pixel blocks based on image characteristics in the object image, as discussed hereinthroughout (see, e.g., FIG. 3). Examples of image characteristics include color, grey scale, texture, contour, shape, etc. Optionally, each categorized pixel block includes a plurality of pixels having the same and/or similar image characteristics. Optionally, pixels having the same or similar image characteristics are categorized into one pixel block. Optionally, pixels having the same image characteristics are categorized into one pixel block, and pixels in pixel blocks adjacent to each other have similar image characteristics. Optionally, positional information corresponding to the pixels in the pixel blocks is stored in a partition table. Optionally, the partition table is a data table including pixel location information (row and column information) of each pixel, and an ID number of a pixel block corresponding to each pixel. Thus, the pixel block corresponding to each pixel can be identified based on the pixel location information using this data table. Moreover, the pixel location information of a pixel in a stereoscopic depth image is the same as that of the corresponding pixel in the object image. Accordingly, the pixel block corresponding to each pixel in a stereoscopic depth image can be identified based on the pixel location information using this data table.

Referring to FIG. 4, the second method for identifying a depth-data region correlated to a no-depth-data region in the embodiment further includes searching through the plurality of categorized pixel blocks to identify a first pixel block corresponding to a no-depth-data region; and identifying a second pixel block having a depth-data region proximal to (e.g., adjacent to) the no-depth-data region. Optionally, the depth-data region proximal to (e.g., adjacent to) the no-depth-data region may include one or more pixels (e.g., one pixel, two pixels, or multiple pixels). Optionally, the first pixel block and the second pixel block may be identified by searching through the partition table.

Referring to FIG. 4, the second method for identifying a depth-data region correlated to a no-depth-data region in the embodiment further includes determining whether the first pixel block and the second pixel block are a same pixel block, e.g., whether they have a same pixel block ID number. Referring to FIG. 4, if the first pixel block and the second pixel block are a same pixel block (e.g., having a same pixel block ID number), the depth-data region in the second pixel block is determined to be a depth-data region correlated to the no-depth-data region in the first pixel block.

Referring to FIG. 4, if the first pixel block and the second pixel block are two different pixel blocks (e.g., having different pixel block ID numbers), the second method further includes calculating a correlation strength between each two adjacent pixel blocks among the plurality of categorized pixel blocks as described hereinthroughout (see, e.g., FIG. 3). For example, pixel blocks adjacent to each other may be identified based on whether one pixel block contains at least one pixel that is located adjacent to at least one pixel in the other pixel block. Optionally, adjacent pixel blocks are identified by directly searching through the partition table. Optionally, a regional similarity method or a boundary strength similarity method may be applied to calculate the correlation strength between two adjacent pixel blocks.

Referring to FIG. 4, once the correlation strength between each two adjacent pixel blocks is determined, the second method further includes identifying the most relevant pixel block correlated to the pixel block associated with the no-depth-data region as described hereinthroughout (see, e.g., FIG. 3).

Referring to FIG. 4, once the most relevant pixel block correlated to the pixel block associated with the no-depth-data region is determined, the second method further includes assigning a depth-data region associated with the most relevant pixel block as the depth-data region correlated to the no-depth-data region.

In some embodiments, the no-depth-data region has a relative small area. Optionally, the second method includes directly assigning the depth data in the depth-data region adjacent to the no-depth-data region as the depth data for the no-depth-data region. Optionally, the second method includes interpolating the depth data in the depth-data region to obtain an interpolated depth data corresponding to the no-depth-data region; and assigning the interpolated depth data as the depth data for the no-depth-data region. This simplified methodology obviates the need for calculating the correlation strength between two adjacent pixel blocks.

In some embodiments, the first pixel block and the second pixel block are a same pixel block (e.g., having a same pixel block ID number). Optionally, the depth data in the depth-data region is directly assigned as the depth data for the no-depth-data region. Optionally, the second method includes interpolating the depth data in the depth-data region to obtain an interpolated depth data corresponding to the no-depth-data region; and assigning the interpolated depth data as the depth data for the no-depth-data region. For example, the stereoscopic depth image may include three adjacent pixels located at three coordinates (k−2, m), (k−1, m), and (k, m), respectively. The pixel located at (k, m) has a depth data $d_{(k, m)}=0$, i.e., it is located in a no-depth-data region. Optionally, three adjacent pixels correspond to a same pixel block, i.e., $R_{(k-2, m)}=R_{(k-1, m)}$. Optionally, an interpolated depth data of the pixel at (k, m) can be obtained by interpolating the non-zero depth data of the pixel at (k−1, m) and that of the pixel at (k−2, m). Optionally, the interpolated depth data is calculated as $d_{(k, m)}=d_{(k-1, m)} \times 2 - d_{(k-2, m)}$.

In some embodiments, the first pixel block and the second pixel block are two different pixel blocks (e.g., having different pixel block ID numbers), and more than one most relevant pixel blocks are identified. Optionally, the more than one most relevant pixel blocks all have a same depth data. In that case, the same depth data is assigned as the depth data for the no-depth-data region. Optionally, the more than one most relevant pixel blocks have multiple different depth data. Optionally, each of the most relevant pixel blocks has multiple different depth data. Optionally, the second method includes averaging all depth data in all of the most relevant pixel blocks to obtain an averaged depth data; and assigning the average depth data as the depth data for the no-depth-data region.

In some embodiments, the first pixel block and the second pixel block are two different pixel blocks (e.g., having different pixel block ID numbers), and only one most relevant pixel blocks are identified. Optionally, one of the most relevant pixel blocks has multiple different depth data. Optionally, the second method includes averaging all depth data in the only one most relevant pixel block to obtain an averaged depth data; and assigning the average depth data as the depth data for the no-depth-data region.

In some embodiments, the pixel block is defined to have an area no smaller than that of the no-depth-data region, i.e., the number of pixels in the pixel block is no smaller than that of the no-depth-data region. This ensures that a pixel block adjacent to the pixel block associated with the no-depth-data region would include at least one depth data.

In some embodiments, the picture region corresponding to a no-depth-data region has substantially the same or similar image characteristics as those of a picture region corresponding to a depth-data region determined to be correlated to the no-depth-data region. This ensures that the depth data used for populating the no-depth-data region (e.g., the depth data derived from the depth data in the depth-data region correlated to the no-depth-data region) is similar to, or substantially the same as, the actual depth data corresponding to the no-depth-data region, improving the accuracy of stereoscopic depth prediction.

In some embodiments, the method for predicting stereoscopic depth further includes populating the depth data assigned to the no-depth-data region, pixel-by-pixel, into the no-depth-data region in the stereoscopic depth image, e.g., copying the assigned depth data, pixel-by-pixel, into the no-depth-data region of the stereoscopic depth image.

Figure 5:
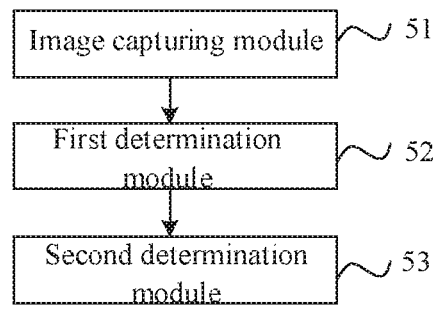
FIG. 5 is a block diagram of an apparatus for predicting stereoscopic depth in some embodiments.

In another aspect, the present disclosure also provides an apparatus for predicting stereoscopic depth information. FIG. 5 is a block diagram of an apparatus for predicting stereoscopic depth in some embodiments. Referring to FIG. 5, the apparatus in the embodiment includes an image capturing module 51 for capturing object images of a target scene and generating a stereoscopic depth image associated with the object images, a first determination module 52 coupled to the image capturing module 51 for identifying a no-depth-data region in the stereoscopic depth image and a depth-data region that is correlated to the no-depth-data region, and a second determination module 53 coupled to the first determination module 52 for assigning a depth data to the no-depth-data region based on a depth data of the depth-data region correlated to the no-depth-data region.

The present disclosure provides a superior apparatus for predicting stereoscopic depth information that overcome the disadvantages and shortcoming of the conventional apparatus. Using the present apparatus (e.g., through the second determination module 53), the depth data for the no-depth-data region can be assigned based on the detected depth data for the depth-data region correlated to the no-depth-data region. The present apparatus thus overcomes the problem associated with the absence of depth data in the depth conversion area caused by the parallax occlusion phenomenon. As a result, complete stereoscopic depth information associated with the depth conversion area C can be obtained, resulting in improved reconstruction of three dimensional shape information.

Examples of image capturing module 51 includes a camera. For example, the image capturing module 51 may be a binocular vision depth measurement system including a main camera and a sub-camera. Optionally, the image capturing module 51 further includes a laser device. The main camera and the sub-camera may be spaced apart by a distance.

In some embodiments, the first determination module 52 is configured to categorize the object image of a target scene into a plurality of categorized pixel blocks based on image characteristics in the object image; to calculate a correlation strength between each two adjacent pixel blocks among the plurality of categorized pixel blocks; to search through the plurality of categorized pixel blocks to identify a pixel block associated with a no-depth-data region; to identify a most relevant pixel block correlated to the pixel block associated with the no-depth-data region based on the correlation strength between each two adjacent pixel blocks; and to assign a depth-data region associated with the most relevant pixel block as the depth-data region correlated to the no-depth-data region.

In some embodiments, the first determination module 52 is configured to categorize the object image of a target scene into a plurality of categorized pixel blocks based on image characteristics in the object image; to search through the plurality of categorized pixel blocks to identify a first pixel block corresponding to a no-depth-data region; to identify a second pixel block having a depth-data region proximal to (e.g., adjacent to) the no-depth-data region; and to determine whether the first pixel block and the second pixel block are a same pixel block, e.g., whether they have a same pixel block ID number.

If the first pixel block and the second pixel block are determined to be a same pixel block (e.g., having a same pixel block ID number), the depth-data region in the second pixel block is determined to be a depth-data region correlated to the no-depth-data region in the first pixel block.

If the first pixel block and the second pixel block are determined to be two different pixel blocks (e.g., having different pixel block ID numbers), the first determination module 52 is further configured to calculate a correlation strength between each two adjacent pixel blocks among the plurality of categorized pixel blocks; to identify the most relevant pixel block correlated to the pixel block associated with the no-depth-data region based on the calculated correlation strength between each two adjacent pixel blocks; and to assign a depth-data region associated with the most relevant pixel block as the depth-data region correlated to the no-depth-data region.

In some embodiments, the first pixel block and the second pixel block are determined to be a same pixel block (e.g., having a same pixel block ID number) by the first determination module 52. Optionally, the second determination module 53 is configured to directly assign the depth data in the depth-data region as the depth data for the no-depth-data region. Optionally, the second determination module 53 is configured to interpolate the depth data in the depth-data region to obtain an interpolated depth data corresponding to the no-depth-data region; and to assign the interpolated depth data as the depth data for the no-depth-data region.

In some embodiments, the first pixel block and the second pixel block are determined to be two different pixel blocks (e.g., having different pixel block ID numbers), and more than one most relevant pixel blocks are identified by the first determination module 52. Optionally, the second determination module 53 is configured to average all depth data in all of the most relevant pixel blocks to obtain an averaged depth data; to assign the average depth data as the depth data for the no-depth-data region; and to populate the average depth data throughout the no-depth-data region.

In some embodiments, the apparatus for predicting stereoscopic depth further includes a depth data populating module coupled to the first determination module 52 and the second determination module 53, respectively. The populating module is configured to populate the depth data assigned for the no-depth-data region pixel-by-pixel into the no-depth-data region in the stereoscopic depth image.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for predicting stereoscopic depth, comprising:
    capturing object images of a target scene;
    generating a stereoscopic depth image associated with the object images;
    identifying a no-depth-data region in the stereoscopic depth image;
    identifying a depth-data region correlated to the no-depth-data region; and
    assigning a depth data to the no-depth-data region based on a depth data of the depth-data region correlated to the no-depth-data region;
    wherein identifying the depth-data region correlated to the no-depth-data region comprises:
    categorizing the object image of the target scene into a plurality of categorized pixel blocks based on image characteristics in the object image; and
    searching through the plurality of categorized pixel blocks to identify a first pixel block associated with a no-depth-data region; and
    wherein the plurality of categorized pixel blocks are categorized based on one or a combination of image characteristics selected from color, grey scale, texture, contour, and shape.

2. The method of claim 1, wherein identifying the depth-data region correlated to the no-depth-data region further comprises:
    generating a partition table storing positional information of each pixel in the plurality of categorized pixel blocks; and
    calculating a correlation strength between each two adjacent pixel blocks among the plurality of categorized pixel blocks, the two adjacent pixel blocks are identified by searching through the partition table.

3. The method of claim 2, wherein identifying the depth-data region correlated to the no-depth-data region further comprises:
    identifying a most relevant pixel block correlated to the first pixel block associated with the no-depth-data region based on the correlation strength between each two adjacent pixel blocks; and
    assigning a depth-data region associated with the most relevant pixel block as the depth-data region correlated to the no-depth-data region.

4. The method of claim 2, wherein identifying a depth-data region correlated to the no-depth-data region further comprising:
    identifying a second pixel block having a depth-data region proximal to the no-depth-data region; and
    determining whether the first pixel block and the second pixel block are a same pixel block.

5. The method of claim 4, wherein the first pixel block and the second pixel block are determined to be a same pixel block; the method further comprising assigning the depth-data region in the second pixel block as the depth-data region correlated to the no-depth-data region in the first pixel block.

6. The method of claim 4, wherein the first pixel block and the second pixel block are determined to be two different pixel blocks; the method further comprising identifying a most relevant pixel block correlated to the first pixel block associated with the no-depth-data region; and assigning one or more a depth-data region associated with the most relevant pixel block as a depth-data region correlated to the no-depth-data region.

7. The method of claim 4, wherein the first pixel block and the second pixel block are determined to be a same pixel block; the method further comprising directly assigning the depth data in the depth-data region as the depth data for the no-depth-data region.

8. The method of claim 4, wherein the first pixel block and the second pixel block are determined to be a same pixel block; the method further comprising interpolating the depth data in the depth-data region to obtain an interpolated depth data corresponding to the no-depth-data region; and assigning the interpolated depth data as the depth data for the no-depth-data region.

9. The method of claim 4, wherein the first pixel block and the second pixel block are determined to be two different pixel blocks, and more than one most relevant pixel blocks are identified; the method further comprising averaging all depth data in all of the more than one most relevant pixel blocks to obtain an averaged depth data; and assigning the average depth data as the depth data for the no-depth-data region.

10. The method of claim 2, wherein each of the plurality of categorized pixel block has an area no smaller than the no-depth-data region.

11. The method of claim 2, further comprising populating the depth data assigned to the no-depth-data region, pixel-by-pixel, into a corresponding no-depth-data region in the stereoscopic depth image.

12. A method for predicting stereoscopic depth, comprising:
    capturing object images of a target scene;
    generating a stereoscopic depth image associated with the object images;

identifying a no-depth-data region in the stereoscopic depth image;
identifying a depth-data region correlated to the no-depth-data region; and
assigning a depth data to the no-depth-data region based on a depth data of the depth-data region correlated to the no-depth-data region;
wherein identifying the depth-data region correlated to the no-depth-data region comprises:
categorizing the object image of the target scene into a plurality of categorized pixel blocks based on image characteristics in the object image;
generating a partition table storing positional information of each pixel in the plurality of categorized pixel blocks;
calculating a correlation strength between each two adjacent pixel blocks among the plurality of categorized pixel blocks, the two adjacent pixel blocks are identified by searching through the partition table; and
searching through the plurality of categorized pixel blocks to identify a first pixel block associated with a no-depth-data region; and
wherein the correlation strength is calculated based on a similarity of average grey scale level between each two adjacent pixel blocks among the plurality of categorized pixel blocks.

13. The method of claim 12, wherein the similarity of average grey scale level between each two adjacent pixel blocks among the plurality of categorized pixel blocks is calculated based on:

$$\delta(R_i, R_j) = \frac{\|R_i\| \cdot \|R_j\|}{\|R_i\| + \|R_j\|} [\mu(R_i) - \mu(R_j)]^2$$

wherein $R_i$ and $R_j$ stand for two adjacent pixel blocks with ID numbers i and j, respectively; $\|R_i\|$ and $\|R_j\|$ are numbers of pixels in pixel blocks $R_i$ and $R_j$, respectively; $\mu(R_i)$ and $\mu(R_j)$ are average grey scale levels in pixel blocks R and $R_1$, respectively.

14. The method of claim 3, wherein identifying the most relevant pixel block correlated to the first pixel block associated with the no-depth-data region based on the correlation strength between each two adjacent pixel blocks comprises identifying a pixel block adjacent to, and having a largest correlation strength with, the first pixel block associated with the no-depth-data region.

15. The method of claim 3, wherein identifying the most relevant pixel block correlated to the first pixel block associated with the no-depth-data region based on the correlation strength between each two adjacent pixel blocks comprises:
obtaining correlation strengths between the first pixel block associated with the no-depth-data region and each pixel block adjacent to it based on a previously calculated correlation strengths for all pairs of every two adjacent pixel blocks;
comparing the obtained correlation strengths to each other; and
selecting one or more the most relevant pixel block that has the largest correlation strength among the obtained correlation strengths.

16. The method of claim 3, wherein assigning the depth data to the no-depth-data region based on the depth data of the depth-data region correlated to the no-depth-data region comprises:

obtaining an average value of the depth data for the one or more depth-data regions in the most relevant pixel block; and
assigning the average value as the depth data for the no-depth-data region.

17. A method for predicting stereoscopic depth, comprising:
capturing object images of a target scene;
generating a stereoscopic depth image associated with the object images;
identifying a no-depth-data region in the stereoscopic depth image;
identifying a depth-data region correlated to the no-depth-data region; and
assigning a depth data to the no-depth-data region based on a depth data of the depth-data region correlated to the no-depth-data region;
wherein identifying the depth-data region correlated to the no-depth-data region comprises:
categorizing the object image of the target scene into a plurality of categorized pixel blocks based on image characteristics in the object image;
generating a partition table storing positional information of each pixel in the plurality of categorized pixel blocks;
calculating a correlation strength between each two adjacent pixel blocks among the plurality of categorized pixel blocks, the two adjacent pixel blocks are identified by searching through the partition table;
searching through the plurality of categorized pixel blocks to identify a first pixel block associated with a no-depth-data region;
identifying a most relevant pixel block correlated to the first pixel block associated with the no-depth-data region based on the correlation strength between each two adjacent pixel blocks; and
assigning a depth-data region associated with the most relevant pixel block as the depth-data region correlated to the no-depth-data region;
wherein assigning the depth data to the no-depth-data region based on the depth data of the depth-data region correlated to the no-depth-data region comprises:
obtaining an average value of the depth data for the one or more depth-data regions in the most relevant pixel block; and
assigning the average value as the depth data for the no-depth-data region; and
wherein assigning the depth data to the no-depth-data region based on the depth data of the depth-data region correlated to the no-depth-data region comprises:
obtaining an average value of the grey scale levels for the one or more depth-data regions in the most relevant pixel block; and
assigning the average value of the grey scale levels as the depth data for the no-depth-data region.

18. The method of claim 12, wherein identifying the depth-data region correlated to the no-depth-data region further comprises:
identifying a most relevant pixel block correlated to the first pixel block associated with the no-depth-data region based on the correlation strength between each two adjacent pixel blocks; and
assigning a depth-data region associated with the most relevant pixel block as the depth-data region correlated to the no-depth-data region.

19. The method of claim 12, wherein identifying a depth-data region correlated to the no-depth-data region further comprising:
- identifying a second pixel block having a depth-data region proximal to the no-depth-data region; and
- determining whether the first pixel block and the second pixel block are a same pixel block.

20. The method of claim 12, wherein the plurality of categorized pixel blocks are categorized based on one or a combination of image characteristics selected from color, grey scale, texture, contour, and shape.

* * * * *